United States Patent
Ha

(10) Patent No.: US 8,896,599 B2
(45) Date of Patent: Nov. 25, 2014

(54) IMAGE PROCESSING APPARATUS AND METHOD

(75) Inventor: In Woo Ha, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 722 days.

(21) Appl. No.: 12/662,288

(22) Filed: Apr. 8, 2010

(65) Prior Publication Data

US 2011/0032256 A1 Feb. 10, 2011

(30) Foreign Application Priority Data

Aug. 6, 2009 (KR) ........................ 10-2009-0072327

(51) Int. Cl.
*G06T 15/50* (2011.01)
*G06T 17/00* (2006.01)
*G06T 15/00* (2011.01)
*G06T 15/60* (2006.01)

(52) U.S. Cl.
CPC ...................................... *G06T 15/60* (2013.01)
USPC ............................ 345/426; 345/420; 345/419

(58) Field of Classification Search
None
See application file for complete search history.

(56) References Cited

U.S. PATENT DOCUMENTS

| | | | |
|---|---|---|---|
| 6,359,619 B1 | 3/2002 | Waters et al. | |
| 2003/0043152 A1 | 3/2003 | Raskar | |
| 2004/0207623 A1* | 10/2004 | Isard et al. | 345/426 |
| 2006/0279570 A1 | 12/2006 | Zhou et al. | |

FOREIGN PATENT DOCUMENTS

| | | |
|---|---|---|
| JP | 7-73342 | 3/1995 |
| KR | 10-0682456 | 2/2007 |
| KR | 10-2008-0055581 | 6/2008 |

OTHER PUBLICATIONS

Malik, http://www.opengl.org/discussion_boards/archive/index.php/t-147977.html, posted online May 15, 2006.*
Williams, Casting Curved Shadows on Curved Surfaces, Proc. of SIGGRAPH'78 p. 270-274.*
Laine et al. Incremental Instant Radiosity for Real-Time Indirect Illumination, Eurographics Symposium on Rendering, 2007.*
Herzog et al. Render2MPEG: A Perception-based Framework Towards Integrating Rendering and Video Compression, Eurographics 2008, vol. 27 2008, No. 2.*
XboxForums, http://xboxforums.create.msdn.com/forums/t/25904.aspx?PageIndex=1, posted online between Feb. 19, 2009-Mar. 2, 2009.*
Nguyen, GPUGems 3, ISBN: 9780321545428 2008.*

* cited by examiner

*Primary Examiner* — Tize Ma
*Assistant Examiner* — Yingchun He
(74) *Attorney, Agent, or Firm* — Staas & Halsey LLP

(57) ABSTRACT

An image processing apparatus is provided. The image processing apparatus may include a first calculator to generate a first shadow map with respect to a static object included in a three-dimensional (3D) model, at a first viewpoint within the 3D model, a second calculator to generate a second shadow map with respect to a dynamic object included in the 3D model, at the first viewpoint, and a third calculator to generate a third shadow map with respect to the 3D model at the first viewpoint by synthesizing the first shadow map and the second shadow map. The image processing apparatus may decrease an amount of calculation necessary when performing three-dimensional (3D) rendering for a plurality of frames.

12 Claims, 13 Drawing Sheets

500

700

900

IMAGE PROCESSING APPARATUS AND METHOD

CROSS-REFERENCE TO RELATED APPLICATIONS

This application claims the benefit of Korean Patent Application No. 10-2009-0072327, filed on Aug. 6, 2009, in the Korean Intellectual Property Office, the disclosure of which is incorporated herein by reference.

BACKGROUND

1. Field

One or more embodiments of the present disclosure relate to real-time rendering with respect to an object constituting a three-dimensional (3D) model, and more particularly, to generating of a shadow map for rendering.

2. Description of the Related Art

With continuing developments in hardware and software technologies, people are increasingly interested in real-time rendering of three-dimensional (3D) models in a variety of fields such as 3D games, virtual world animations, movies, and the like.

A large amount of calculation may be needed to perform high quality 3D rendering. Due to low hardware performance, there is a limit on real-time rendering. Accordingly, conventional researches are focused on enhancing hardware performance and efficiently performing calculations in order to decrease the amount of calculation required.

In a 3D rendering scheme, a radiosity scheme denotes a scheme for enhancing rendering quality based on direct illumination by light existing within a 3D model and indirect illumination by reflected light that is created by reflecting the direct illumination from an object, a scattered reflection, and the like.

In this case, a process of locating a virtual point light (VPL) in a particular location within the 3D model to generate a shadow map observed at a viewpoint of the VPL is required. When the number of VPLs is increased in order to enhance the rendering quality, the amount of calculation required may also increase.

SUMMARY

Additional aspects and/or advantages will be set forth in part in the description which follows and, in part, will be apparent from the description, or may be learned by practice of the disclosure.

According to an aspect of one or more embodiments, there may be provided an image processing apparatus including a first calculator, executing on a processor, to generate a first shadow map with respect to a static object included in a 3D model, at a first viewpoint within the 3D model, a second calculator to generate a second shadow map with respect to a dynamic object included in the 3D model, at the first viewpoint, and a third calculator to generate a third shadow map with respect to the 3D model at the first viewpoint by synthesizing the first shadow map and the second shadow map.

The image processing apparatus may further include a rendering unit to render an image observed at a second viewpoint within the 3D model using the third shadow map.

The first viewpoint may be associated with a first virtual point light (VPL) within the 3D model. The first VPL may be located on the static object included in the 3D model.

The image processing apparatus may further include a fourth calculator to generate a fourth shadow map with respect to the 3D model at a third viewpoint of the 3D model.

In this case, the rendering unit may render an image observed at a second viewpoint within the 3D model using the third shadow map and the fourth shadow map.

The third viewpoint may be associated within a second VPL within the 3D model. The second VPL may be located on the dynamic object included in the 3D model.

According to another aspect of one or more embodiments, there is provided an image processing apparatus to render a 3D model into an image including a plurality of frames, the image processing apparatus including a first calculator, executing on a processor, to generate a first shadow map with respect to a static object included in the 3D model, at a first viewpoint within the 3D model during a first frame calculation process of the image, and to provide the first shadow map for a second frame calculation process of the image, a second calculator to generate a second shadow map with respect to a dynamic object included in the 3D model during the second frame calculation process of the image, and a third calculator to generate a third shadow map with respect to the 3D model at the first viewpoint by synthesizing the first shadow map and the second shadow map during the second frame calculation process of the image.

The image processing apparatus may further include a rendering unit to render the image observed at a second viewpoint within the 3D model using the third shadow map during the second frame calculation process of the image.

The image processing apparatus may further include a fourth calculator to generate a fourth shadow map with respect to the 3D model at a third viewpoint within the 3D model during the second frame calculation process of the image.

In this case, the rendering unit may render an image observed at a second viewpoint within the 3D model using the third shadow map and the fourth shadow map during the second frame calculation process of the image.

The first viewpoint may be associated with a first VPL located on the static object included in the 3D model. The third viewpoint may be associated with a second VPL located on the dynamic object included in the 3D model.

According to still another aspect of one or more embodiments, there is provided an image processing method including generating, by way of a processor, a first shadow map with respect to a static object included in a 3D model, at a first viewpoint within the 3D model, generating a second shadow map with respect to a dynamic object included in the 3D model, at the first viewpoint, and generating a third shadow map with respect to the 3D model at the first viewpoint by synthesizing the first shadow map and the second shadow map.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
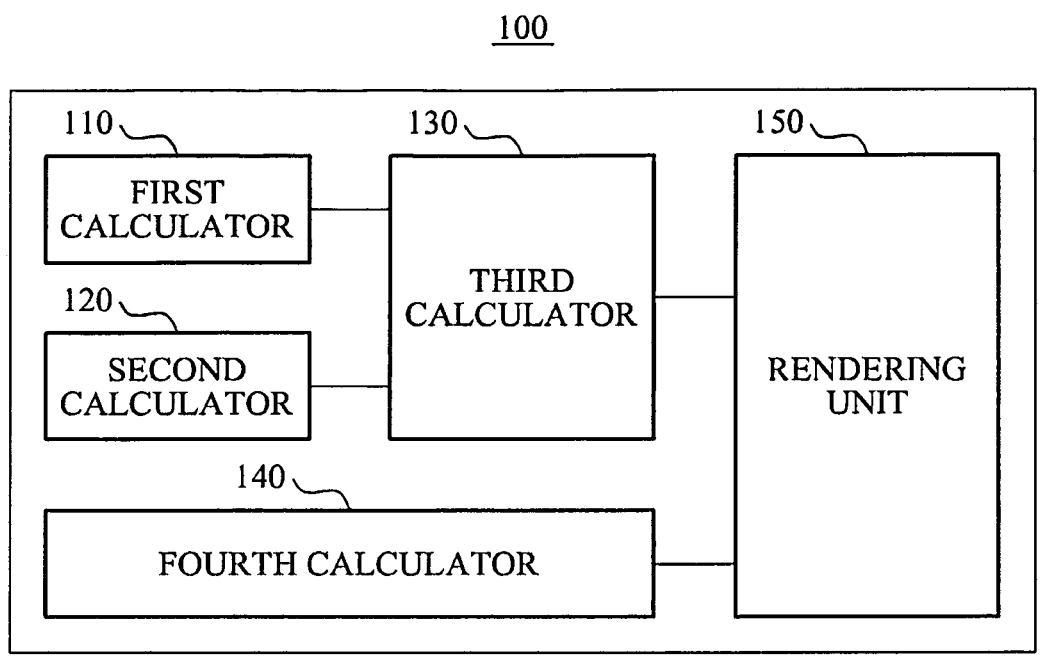
FIG. 1 illustrates an image processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to an embodiment.

When a rendering process is performed for a three-dimensional (3D) model observed at a particular viewpoint, a first calculator 110 may generate a first shadow map based on a static object included in the 3D model, with respect to a first virtual point light (VPL) that is located on the static object.

The generated first shadow map may be used repeatedly for image rendering of a plurality of frames followed by a current frame.

Once the first shadow map is generated, the first calculator 110 may store the first shadow map in a predetermined storage unit (not shown), and may provide the first shadow map for each frame.

For image rendering of a $k^{th}$ frame, where k denotes a natural number, a second calculator 120 may generate a second shadow map in real time based on a dynamic object included in the 3D model, with respect to the first VPL.

The generated second shadow map may be provided to a third calculator 130 together with the first shadow map. The third calculator 130 may generate a third shadow map based on all of the objects included in the 3D model, observed at a viewpoint of the first VPL, by synthesizing the first shadow map and the second shadow map.

Operations of the first calculator 110, the second calculator 120, and the third calculator 130 will be further described with reference to FIGS. 7 through 9.

A fourth calculator 140 may generate a fourth shadow map in real time based on all of the objects included in the 3D model, with respect to a second VPL that is located on the dynamic object.

The third shadow map and the fourth shadow map may be transferred to a rendering unit 150. The rendering unit 150 may render a $k^{th}$ frame image observed at the particular viewpoint using a radiosity scheme.

The preceding process will be further described with reference to FIG. 10.

Figure 2:
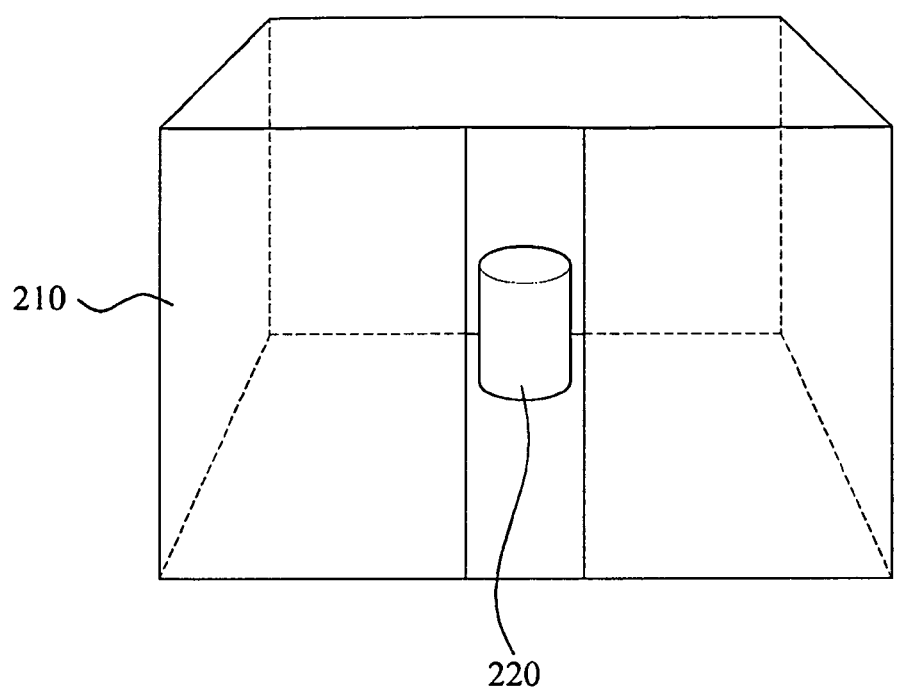
FIG. 2 illustrates an object of a three-dimensional (3D) model to be rendered using an image processing apparatus and method according to an embodiment.

FIG. 2 illustrates an object of a 3D model 200 to be rendered using an image processing apparatus and method according to an embodiment;

The 3D model 200 may include a static object 210 that represents a room with a partially open front and a dynamic object 220 that is positioned within the room.

The static object 210 refers to an object for which a location in a coordinate space does not vary over time. The dynamic object 220 refers to an object for which a location in the coordinate space may vary over time.

Hereinafter, a process of rendering, at a particular viewpoint, the 3D model 200 that includes the static object 210 and the dynamic object 220 will be described. The 3D model 200 is only an example for ease of description and thus various applications may be employed.

Figure 3:
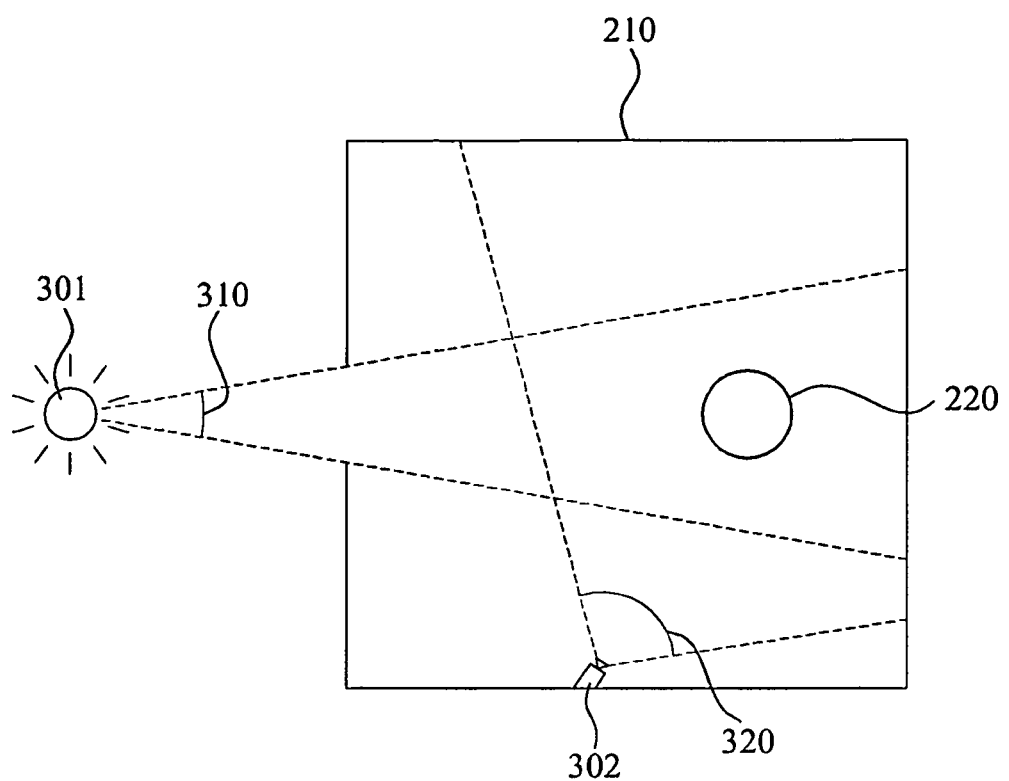
FIG. 3 illustrates a top view of the object and a light source of the 3D model of FIG. 2.

FIG. 3 illustrates a top view of objects and a light source 301 of the 3D model 200 of FIG. 2.

The light source 301 that may be considered for rendering of the 3D model 200 may be located outside the static object 210 in a form of a hexahedral room to provide light to the inside of the static object 210 via a gap of the partially open front of the static object 210.

A range of the light of the light source 301 located outside the static object 210 that reaches the inside of the static object 210 may be expressed using an angle 310. The direct light may not reach a portion outside the angle 310 within the static object 210.

An area observed at a viewpoint 302 for image rendering may be expressed using an angle 320. Hereinafter, a process of calculating a color value of an image within the angle 320 to render an image will be described in detail.

Figure 4:
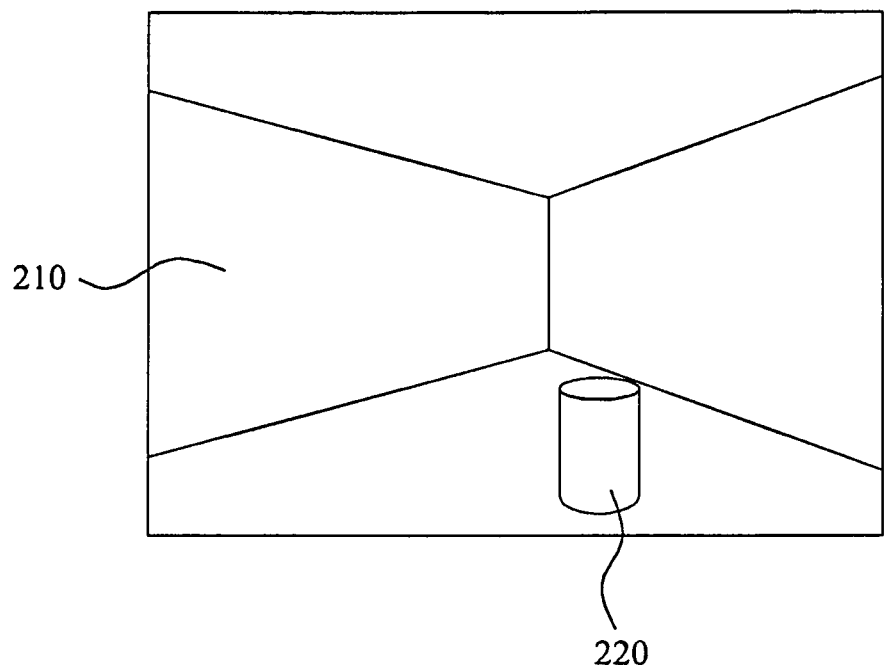
FIG. 4 illustrates the objects of the 3D model of FIG. 2 observed at a viewpoint to be rendered.

FIG. 4 illustrates the objects of the 3D model 200 of FIG. 2 observed at the viewpoint 302.

FIG. 4 illustrates the static object 210 and the dynamic object 220. Whether each of the objects included in a 3D model corresponds to a static object or a dynamic object may be determined in advance through a 3D modeling process.

A rendering process according to an embodiment may calculate a color value of each pixel constituting an image observed at the viewpoint 302.

Figure 5:
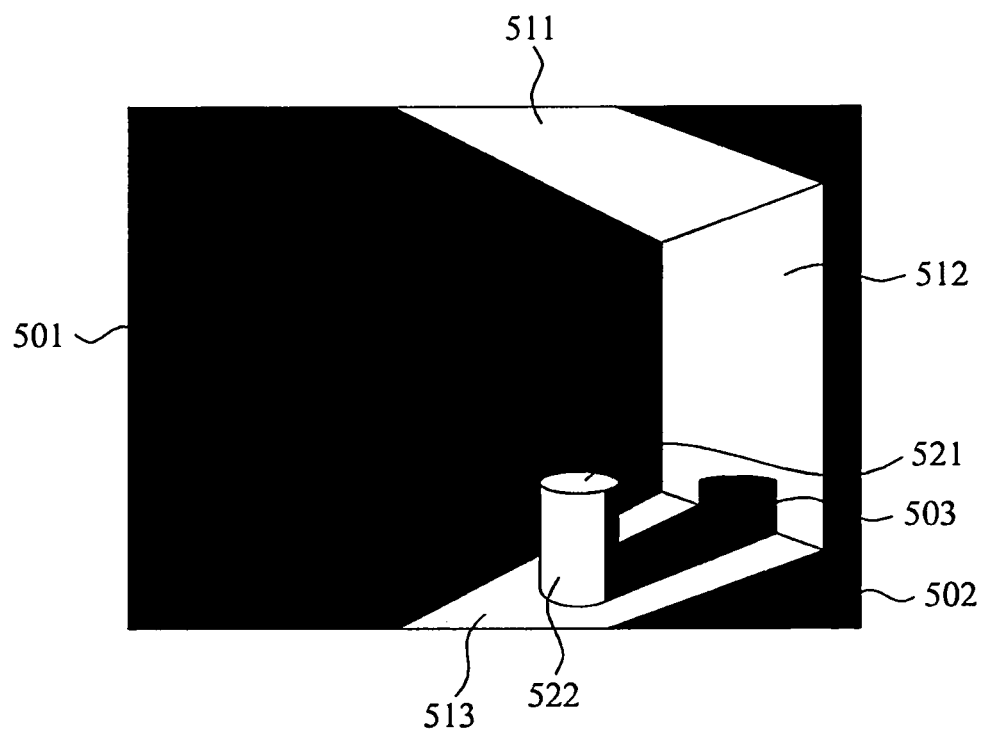
FIG. 5 illustrates a conceptual diagram to describe a rendering result of the object of FIG. 4, when a virtual point light (VPL) is not considered.

FIG. 5 illustrates a conceptual diagram to describe a rendering result of the object of FIG. 4, when a VPL is not considered.

When only the effect of direct illumination from the light source 301 of FIG. 3 is considered, color values of pixels corresponding to a portion outside the angle 310 may become zero. For example, color values of pixels included in areas 501, 502, and 503, corresponding to a shadow portion where the light emitted from the light source 301 does not directly reach, may become zero. Accordingly, the pixels may be expressed as pitch black.

This may be contrasted with color values of pixels included in areas 511, 512, and 513 among pixels corresponding to a static object, and color values of pixels included in areas 521 and 522 among pixels corresponding to a dynamic object are not zero.

However, the preceding result may be different from an actual result. The preceding result fails to consider indirect illumination or light reflected by the object, of the light emitted from the light source 301. Such indirect illumination or reflected light may thereby reach another portion of the object not receiving direct illumination from the light source 301. In addition to the indirect illumination, the above result does not consider physical phenomena such as scattered reflection, diffraction, and the like.

To express the reflected light and the like, rendering may be performed by including a VPL within the 3D model 200. This scheme is referred to as a radiosity scheme.

Figure 6:
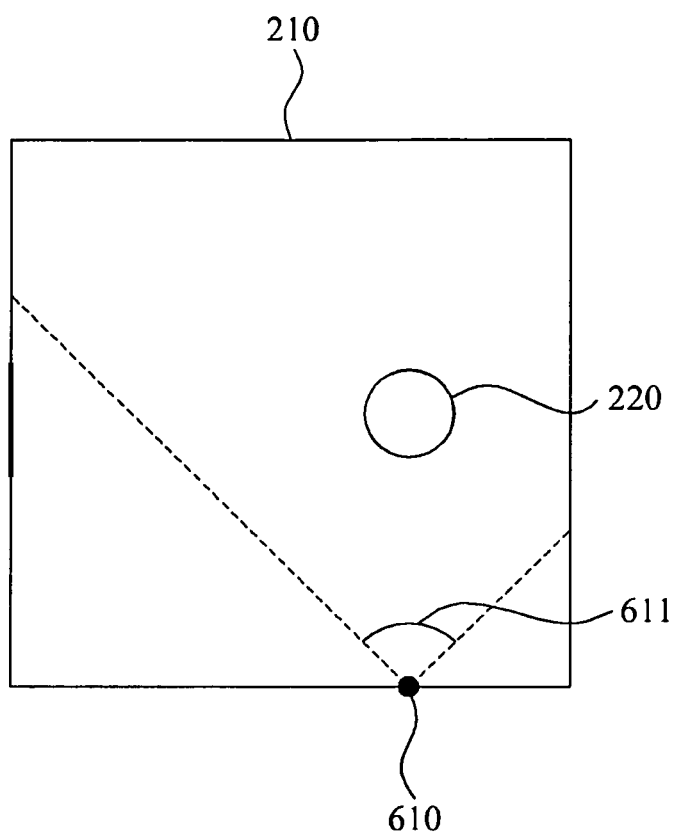
FIG. 6 illustrates a VPL within the top view of FIG. 3, when the VPL is set to be located on the object of the 3D model of FIG. 2 according to an embodiment.

FIG. 6 illustrates a VPL 610 within the top view of FIG. 3, when the VPL is set to be located on the object of the 3D model 200 of FIG. 2 according to an embodiment.

A shadow map may be generated at a viewpoint of the VPL 610 to calculate the effect of the VPL 610, set to be located on an inner wall of the static object 210, affecting color value rendering of objects.

The shadow map may provide depth information of an object observed at the viewpoint of the VPL 610. By way of this depth information, it is possible to distinguish portions of the object for which color values need to be corrected, due to the VPL 610, from other portions of the object for which color values do not need to be corrected, with respect to objects included in the 3D model 200.

When rendering an image including a plurality of frames, a conventional radiosity scheme calculates all objects included in the 3D model 200 and the VPL 610 for each frame to generate a shadow map. Accordingly, a relatively large number of calculations may be used. For real-time rendering, hardware with a very high specification may be required or there may be a limit on increasing a number of VPLs.

However, according to an embodiment, a first shadow map may be generated based on the static object 210 with respect to the VPL 610. The generated first shadow map may be repeatedly used for a plurality of frames. A second shadow map may be generated by considering the dynamic object 220 in real time for a rendering process of a particular frame image. A third shadow map may be generated based on both the static object 210 and the dynamic object 220 by synthesizing the first shadow map and the second shadow map.

In many cases, with respect to all objects included in a 3D model, a quantity of dynamic objects for which locations vary over time, for example, a human being, a car, an animal, a ball, and the like is relatively small in comparison to a quantity of static objects.

Accordingly, when a shadow map is regenerated for each frame with respect to the static objects constituting the largest portion of the 3D model, resources may be wasted due to duplicate calculations. When calculation efficiency is enhanced by avoiding the duplicate calculation, it is possible to significantly decrease an amount of calculation required to obtain the same rendering quality.

An image processing apparatus and method according to an embodiment may separately generate a first shadow map based on a static object and generate a second shadow map based on a dynamic object with respect to the VPL 610, and may generate a third shadow map based on all objects of a 3D model by synthesizing the first shadow map and the second shadow map. Hereinafter, the process of generating the third shadow map will be described in detail.

Figure 7:
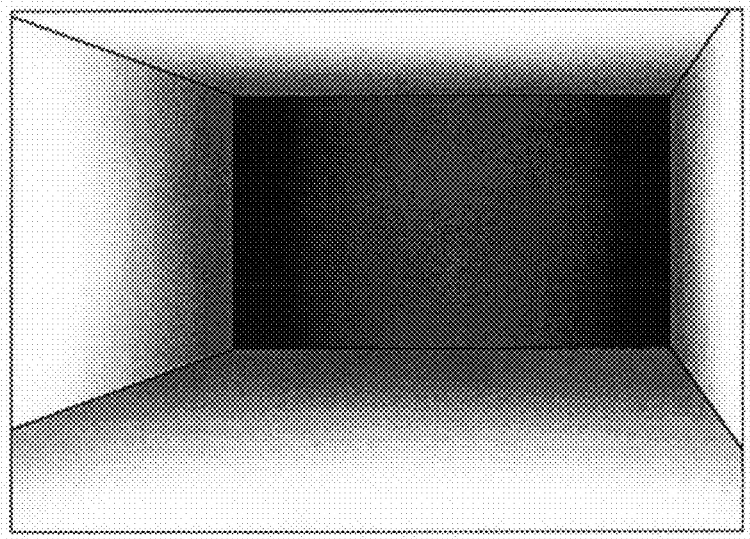
FIG. 7 illustrates a result of generating a shadow map at a viewpoint of the VPL of FIG. 6 based on a static object according to an embodiment.

FIG. 7 illustrates a result of generating a shadow map at a viewpoint of the VPL 610 of FIG. 6 based on the static object 210 according to an embodiment.

A first shadow map 700 to provide depth information at the viewpoint of the VPL 610 may be generated by calculating a relative location from the VPL 610 with respect to the static object 210. A location of the first shadow map 700 may be nearly the same for each frame. Accordingly, once the first shadow map 700 is generated, the first shadow map 700 may be reused for subsequent frames.

Figure 8:
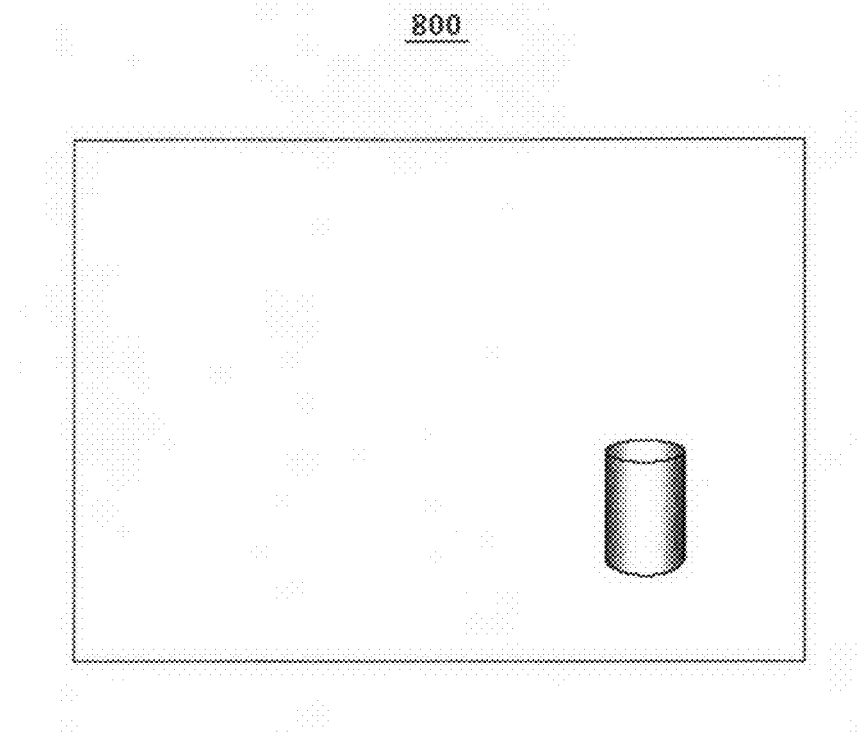
FIG. 8 illustrates a result of generating a shadow map at the viewpoint of the VPL of FIG. 6 based on a dynamic object according to an embodiment.

FIG. 8 illustrates a result of generating a shadow map at the viewpoint of the VPL 610 of FIG. 6 based on the dynamic object 220 according to an embodiment.

A second shadow map 800 to provide depth information at the viewpoint of the VPL 610 may be generated by calculating a relative location from the VPL 610 with respect to the dynamic object 220. A location of the dynamic object 220 may vary for each frame. Accordingly, even when the second shadow map 800 is generated, the second shadow map may not be used as is.

Depending on embodiments, it may be possible to simplify the generation of a shadow map in a current frame based on a correlation between a location of a dynamic object in a previous frame and a location of the dynamic object in the current frame.

Figure 9:
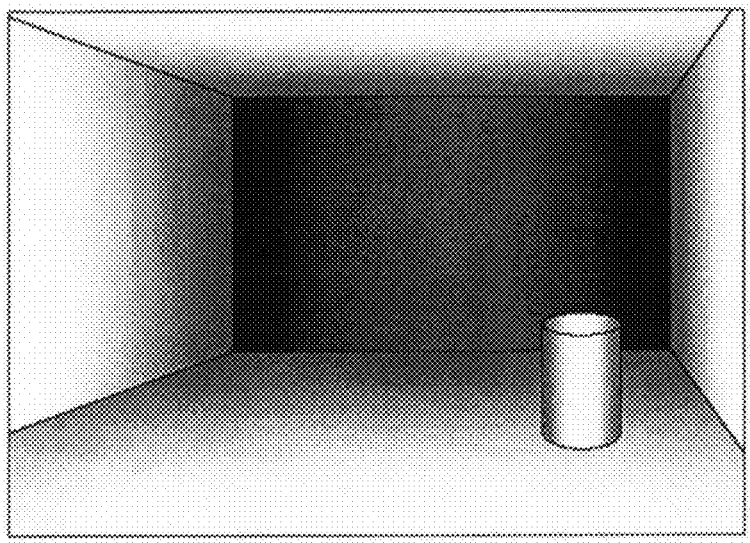
FIG. 9 illustrates a result of generating a shadow map based on both the static object and the dynamic object by synthesizing the shadow map of FIG. 7 and the shadow map of FIG. 8.

FIG. 9 illustrates a result of generating a shadow map based on both the static object 210 and the dynamic object 220 by synthesizing the first shadow map 700 of FIG. 7 and the second shadow map 800 of FIG. 8.

As described above, once the first shadow map 700 is generated in any one frame, the first shadow map 700 may be repeatedly used for frames followed by the corresponding frame, resulting in decreased computation. The second shadow map 800 may be generated in real time for each frame for image rendering.

When the second shadow map 800 based on the dynamic object 220 is generated, the generated second shadow map 800 may be synthesized with the first shadow map 700 that is generated in advance based on the static object 210. In this case, when depth values of at least two objects having the same direction exist at the viewpoint of the VPL 610, an object that is nearer to the VPL 610, that is, an object that has a smaller depth value may be selected. An unselected object may be determined as a shadow.

According to the above scheme, a shadow map 900 based on all objects may be generated at the viewpoint of the VPL 610. Generation of the shadow map 900 may be performed in real time for each frame calculation process.

When the shadow map 900 based on all of the objects is generated, the light from the VPL 610 may be considered to calculate a color value of a portion where the light from the VPL 610 directly reaches. In this case, an intensity of light, a color of light, a distance from the VPL 610, and the like may affect the calculation.

The light from the VPL 610 may not be considered to calculate a color value of a shadow portion where the light from the VPL 610 does not directly reach.

Through the above process, a color value of at least one portion of a completely black area of FIG. 5 may be modified to be a value excluding zero.

A process of generating a shadow map by providing a single VPL on the static object 210 is described above. When a plurality of VPLs exists, shadow maps generated based on a static object with respect to the VPLs may be reused to generate shadow maps in subsequent frames. Accordingly, the overall amount of calculations may significantly decrease.

Figure 10:
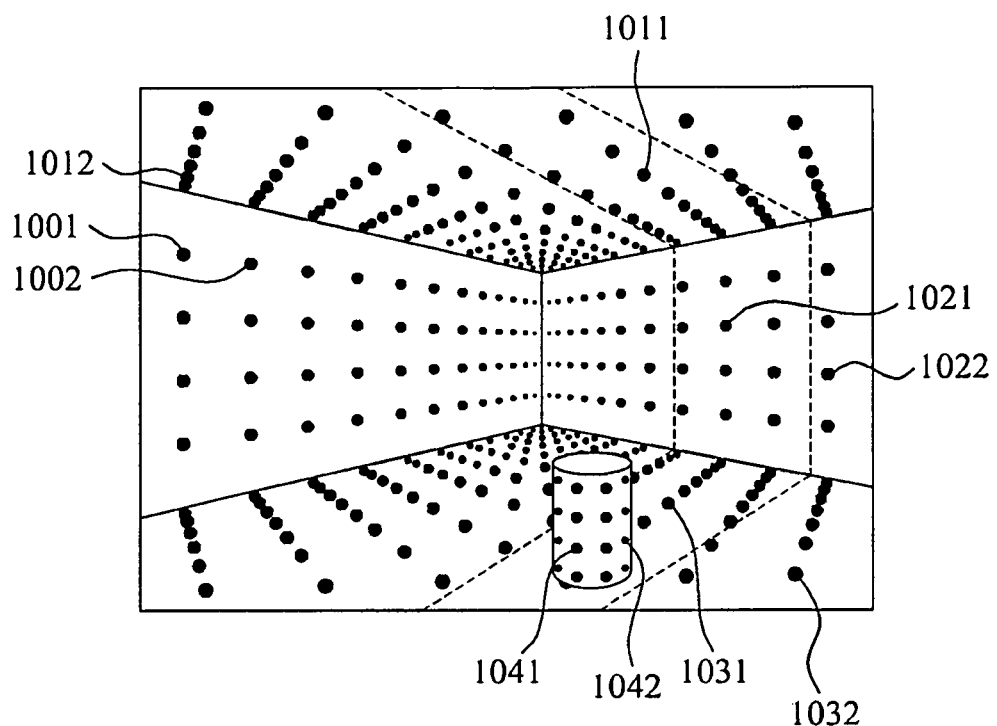
FIG. 10 illustrates an example of providing a plurality of VPLs set to be located within the object of the 3D model of FIG. 2.

FIG. 10 illustrates an example of providing a plurality of VPLs set to be located within the object of the 3D model 200 of FIG. 2.

The plurality of VPLs may be set to be located on objects. A portion of the VPLs, for example, VPLs 1001, 1002, 1011, 1012, 1021, 1022, 1031, and 1032 may be set to be located on the static object 210.

With respect to the VPLs set to be located on the static object 210, a shadow map may be generated using the scheme described above with reference to FIGS. 7 through 9.

However, with respect to a portion of the VPLs, for example, VPLs 1041 and 1042 set to be located on the dynamic object 220, a shadow map may be generated based on both the static object 210 and the dynamic object 220 for each frame.

When rendering the 3D model 200 observed at the viewpoint of FIG. 4 according to a radiosity scheme based on a plurality of VPLs, a soft shadow, a backlight, a reflected light, and the like may be expressed. Accordingly, a rendering quality of an image may be enhanced and a calculation efficiency may be greatly enhanced during the rendering process.

Figure 11:
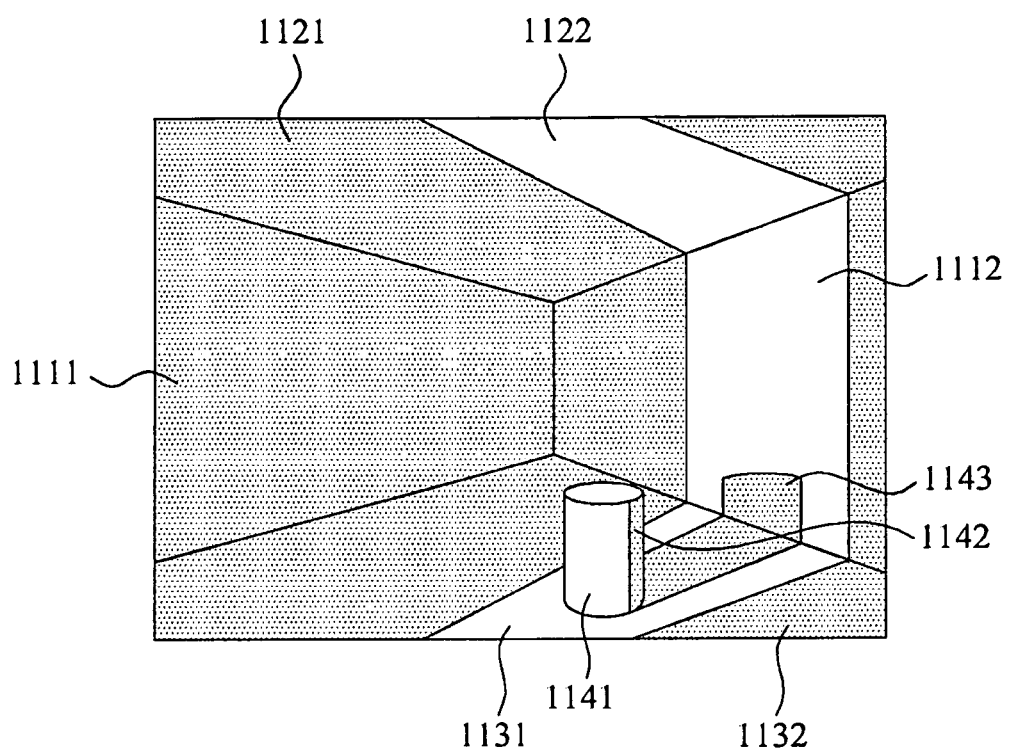
FIG. 11 illustrates a result of rendering the object of FIG. 4 based on a VPL according to an embodiment.

FIG. 11 illustrates a result of rendering the object of FIG. 4 based on a VPL according to an embodiment.

It can be seen from FIG. 11 that color values corresponding to the areas 501, 502, and 503 of FIG. 5 that are expressed as pitch black in FIG. 5, are modified to be a value excluding zero in FIG. 11. Accordingly, a wall and a ceiling are indistinguishable in the area 501 of FIG. 5, whereas the portion corresponding to the area 501 may be expressed using a wall portion 1111 and a ceiling portion 1121, e.g., as in FIG. 11.

Color values of other portions 1112, 1122, 1131, 1132, 1141, 1142, and 143 may be modified.

Figure 12:
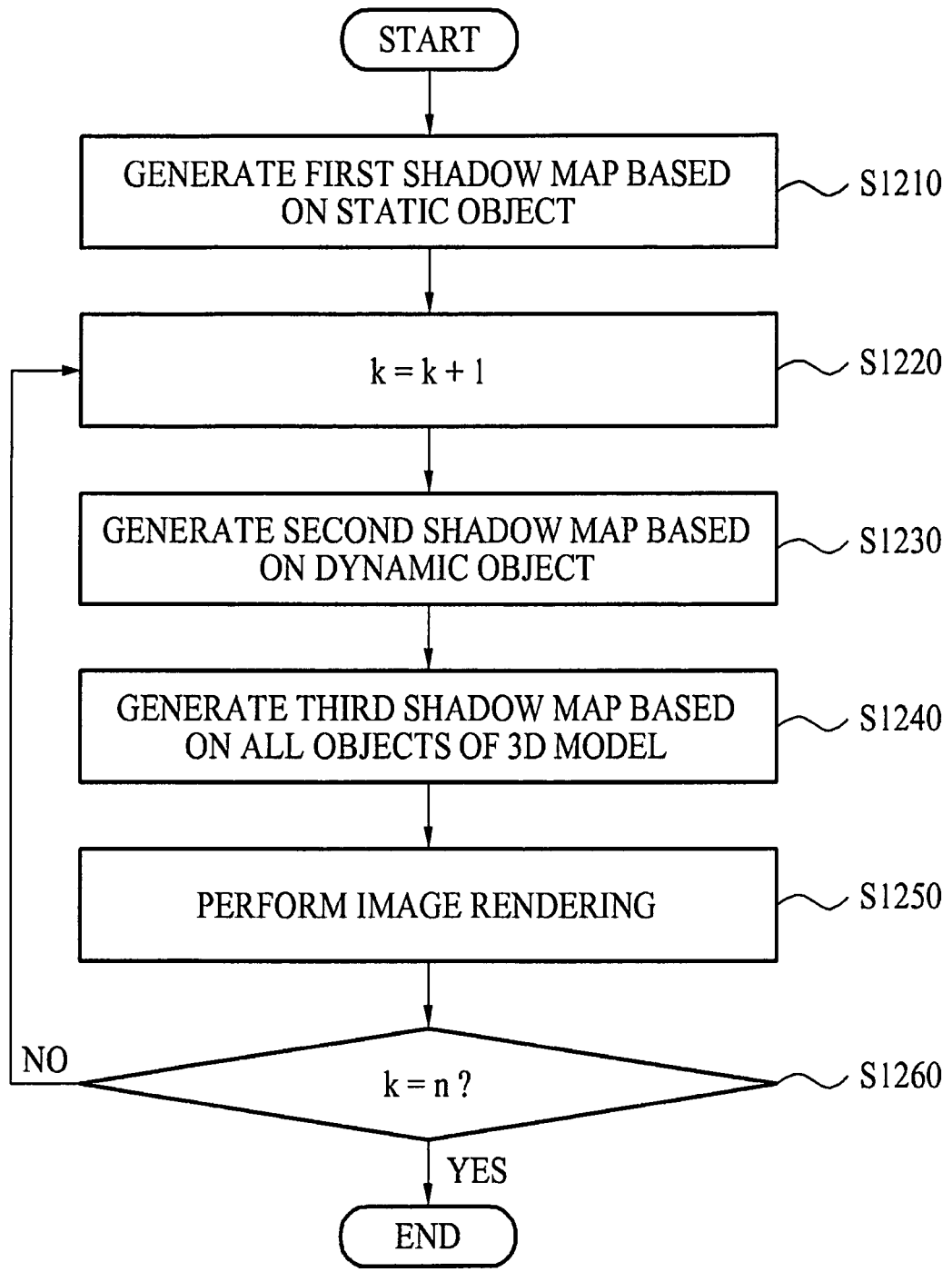
FIG. 12 illustrates an image processing method according to an embodiment.

FIG. 12 illustrates an image processing method according to an embodiment.

When a rendering process is performed at a particular viewpoint, a first shadow map may be generated based on a static object with respect to a VPL in operation S1210. The first shadow map may be repeatedly used for image rendering of frames followed by a current frame.

In operation S1220, "1" may be added to a frame index k. In operation S1230, a second shadow map may be generated based on a dynamic object in a $k^{th}$ frame with respect to the VPL.

A process of generating the first shadow map and the second shadow map may be the same as the process described above with reference to FIGS. 7 and 8.

In operation S1240, a third shadow map may be generated based on all objects included in a 3D model by synthesizing the first shadow map that is generated in advance and the second shadow map that is generated in real time in the $k^{th}$ frame.

A process of generating the third shadow map may be the same as the process described above with reference to FIG. 9.

In operation S1250, image rendering in the $k^{th}$ frame may be performed using the third shadow map. The image rendering may be performed using a general radiosity scheme.

In operation S1260, whether the $k^{th}$ frame corresponds to a last frame, that is, whether k=n may be determined. Operations S1220 through S1260 may be repeated until rendering is performed up to an $n^{th}$ frame image.

Figure 13:
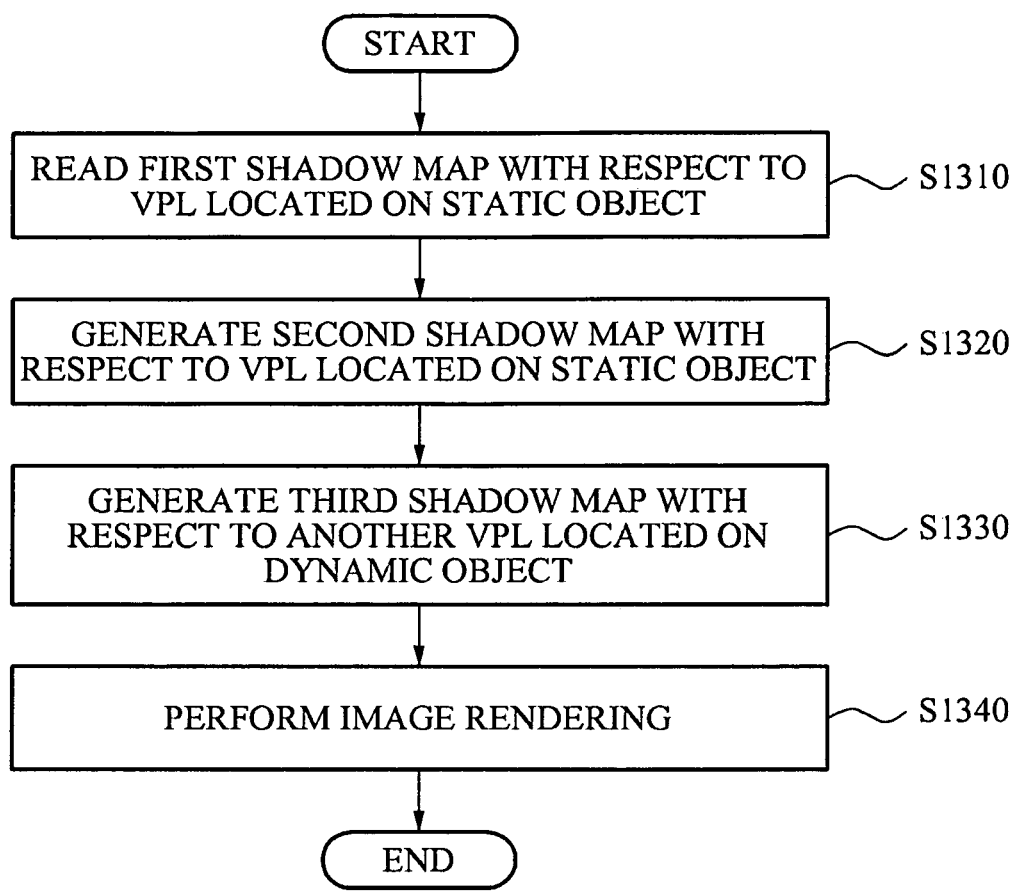
FIG. 13 illustrates an image processing method according to another embodiment.

FIG. 13 illustrates an image processing method according to another embodiment.

FIG. 13 illustrates an image processing method when at least one VPL is set to be located on a dynamic object.

In operation S1310, a first shadow map generated in advance based on a static object may be read with respect to a VPL located on the static object. The first shadow map may be repeatedly used for image rendering of frames followed by a corresponding current frame and thus may be separately stored.

In operation S1320, a second shadow map based on the dynamic object in a $k^{th}$ frame may be generated in real time with respect to the VPL located on the static object.

In operation S1330, a third shadow map based on both the dynamic object and the static object in the current $k^{th}$ frame may be generated in real time with respect to another VPL that is located on the dynamic object.

An image of the $k^{th}$ frame may be rendered based on the first shadow map, the second shadow map, and the third shadow map according to a radiosity scheme in operation S1340.

A single frame image may be rendered by performing operations S1310 through S1340. A plurality of frame images may be rendered by repeating the above process.

The image processing method according to the above-described embodiments may be recorded in computer-readable media including program instructions to implement various operations executable by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as that produced by a compiler, and files containing higher level code that may be executed by the computer using an interpreter.

The described hardware devices may be configured to implement one or more software modules in order to perform the operations of the above-described embodiments, or vice versa. The image processing methods of the present disclosure may be executed on a general purpose computer or processor or may be executed on a particular machine such as the image processing apparatus described herein.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus to render a 3D model into an image including a plurality of frames, the image processing apparatus comprising:
    a first calculator, executing on a processor, to generate a first shadow map with respect to a static object included in a three-dimensional (3D) model, at a first viewpoint associated with a first virtual point light (VPL) located on the static object included in the 3D model;
    a second calculator to generate a second shadow map with respect to a dynamic object included in the 3D model, at the first viewpoint associated with the first VPL located on the static object;
    a third calculator to generate a third shadow map with respect to the 3D model at the first viewpoint associated with the first VPL located on the static object by synthesizing the first shadow map and the second shadow map, wherein the third calculator reuses, in subsequent image frames, the first shadow map generated for the static object in a first image frame of the plurality of image frames; and
    a fourth calculator to generate a fourth shadow map with respect to the 3D model at a second viewpoint associated with a second VPL located on the dynamic object included in the 3D model.

2. The image processing apparatus of claim 1, further comprising:
    a rendering unit to render an image observed at a third viewpoint within the 3D model using the third shadow map.

3. The image processing apparatus of claim 1, wherein the fourth calculator generates the fourth shadow map based on both the static object and the dynamic object for each frame of the plurality of frames.

4. The image processing apparatus of claim 3, further comprising:
a rendering unit to render an image observed at a second viewpoint within the 3D model using the third shadow map and the fourth shadow map.

5. An image processing apparatus to render a 3D model into an image including a plurality of frames, the image processing apparatus comprising:
a first calculator, executing on a processor, to generate a first shadow map with respect to a static object included in the 3D model, at a first viewpoint associated with a first virtual point light (VPL) located on the static object included in the 3D model during a first frame calculation process of the image, and to provide the first shadow map for a second frame calculation process of the image;
a second calculator to generate a second shadow map with respect to a dynamic object included in the 3D model, at the first view point during the second frame calculation process of the image;
a third calculator to generate, during the second frame calculation process of the image, a third shadow map with respect to the 3D model at the first viewpoint associated with the first VPL located on the static object by synthesizing the first shadow map and the second shadow map; and
a fourth calculator to generate a fourth shadow map with respect to the 3D model at a second viewpoint associated with a second VPL located on the dynamic object included in the 3D model.

6. The image processing apparatus of claim 5, further comprising:
a rendering unit to render the image observed at a third viewpoint within the 3D model using the third shadow map during the second frame calculation process of the image.

7. The image processing apparatus of claim 5,
wherein the fourth calculator generates the fourth shadow map based on both the static object and the dynamic object during the first frame calculation process and the second frame calculation process of the image.

8. The image processing apparatus of claim 7, further comprising:
a rendering unit to render an image observed at a second viewpoint within the 3D model using the fourth shadow map during the second frame calculation process of the image.

9. An image processing method for rendering a 3D model into an image including a plurality of frames, the image processing method comprising:
generating, by way of a processor, a first shadow map with respect to a static object included in a 3D model, at a first viewpoint associated with a first virtual point light (VPL) located on the static object included in the 3D model;
generating a second shadow map with respect to a dynamic object included in the 3D model, at the first viewpoint associated with the first VPL located on the static object;
generating a third shadow map with respect to the 3D model at the first viewpoint associated with the first VPL located on the static object by synthesizing the first shadow map and the second shadow map, wherein in the generating of the third shadow map, the first shadow map generated for the static object in a first image frame of the plurality of image frames is reused in subsequent image frames; and
generating a fourth shadow map with respect to the 3D model at a second viewpoint associated with a second VPL located on the dynamic object included in the 3D model.

10. The image processing method of claim 9, further comprising:
rendering an image observed at a third viewpoint within the 3D model using the third shadow map.

11. The image processing method of claim 10,
wherein the fourth shadow map is generated based on both the static object and the dynamic object for each frame of the plurality of frames.

12. A non-transitory computer-readable recording medium having stored thereon instructions to cause a computer to implement an image processing method for rendering a 3D model into an image including a plurality of frames, the image processing method comprising:
generating a first shadow map with respect to a static object included in a 3D model, at a first viewpoint associated with a first virtual point light (VPL) located on the static object included the 3D model;
generating a second shadow map with respect to a dynamic object included in the 3D model, at the first viewpoint associated with the first VPL locate on the static object; and
generating a third shadow map with respect to the 3D model at the first viewpoint associated with the first VPL located on the static object by synthesizing the first shadow map and the second shadow map, wherein in the generating of the third shadow map, the first shadow map generated for the static object in a first image frame of the plurality of image frames is reused in subsequent image frames; and
generating a fourth shadow map with respect to the 3D model at a second viewpoint associated with a second VPL located on the dynamic object included in the 3D model.

* * * * *

UNITED STATES PATENT AND TRADEMARK OFFICE
CERTIFICATE OF CORRECTION

| | | |
|---|---|---|
| PATENT NO. | : 8,896,599 B2 | Page 1 of 1 |
| APPLICATION NO. | : 12/662288 | |
| DATED | : November 25, 2014 | |
| INVENTOR(S) | : Ha | |

It is certified that error appears in the above-identified patent and that said Letters Patent is hereby corrected as shown below:

In the Claims

Column 10, Line 39, Claim 12, delete "locate" and insert -- located --, therefor.

Signed and Sealed this
Twenty-third Day of June, 2015

Michelle K. Lee
*Director of the United States Patent and Trademark Office*